April 14, 1925. 1,533,468
G. SCHEIB
METHOD AND APPARATUS FOR REGULATING THE MIXTURE OF GASES
Filed Sept. 25, 1920
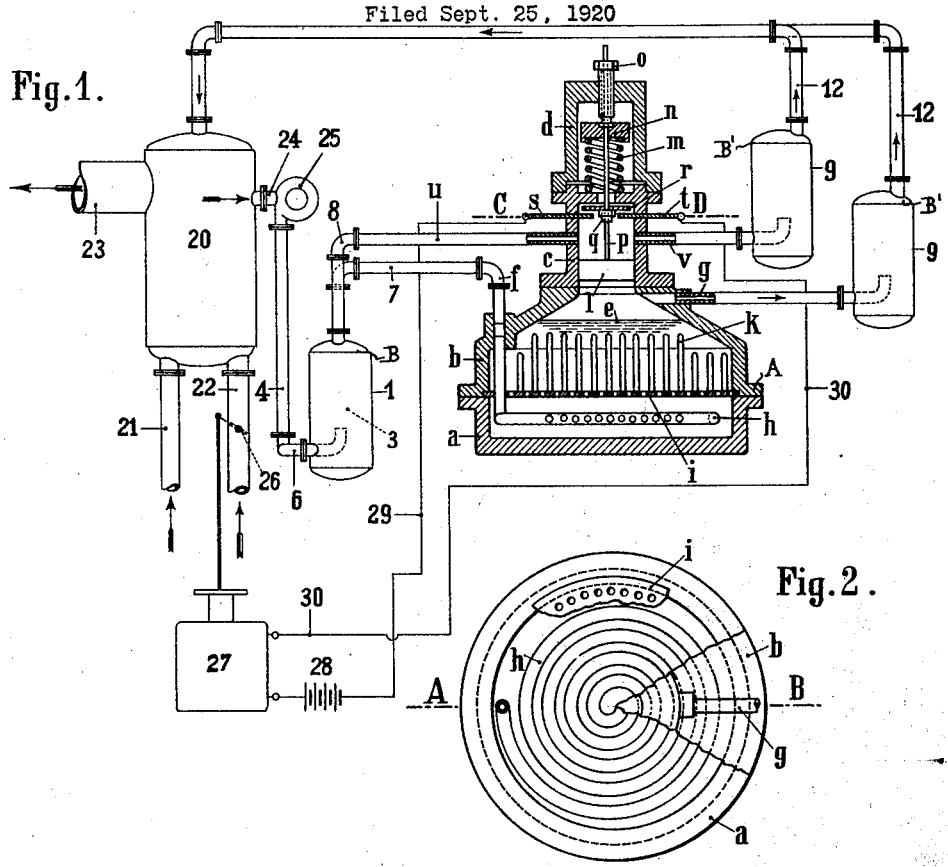
Fig.1.
Fig.2.
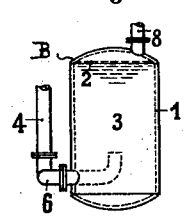
Fig.3.
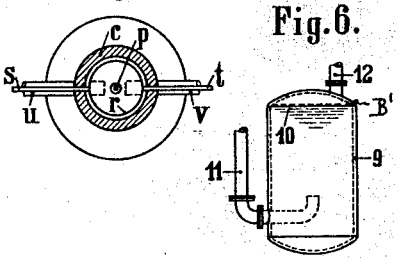
Fig.4. Fig.6.
Fig.5. Fig.7.
Inventor:
Georg Scheib,
by W. Schoenbow.

Patented Apr. 14, 1925.

1,533,468

UNITED STATES PATENT OFFICE.

GEORG SCHEIB, OF BERLIN, GERMANY, ASSIGNOR OF ONE-FOURTH TO HANS GÜNTHERBERG, ONE-FOURTH TO RICHARD IHLENFELDT, AND ONE-FOURTH TO MAX KOCH, ALL OF BERLIN, GERMANY.

METHOD AND APPARATUS FOR REGULATING THE MIXTURE OF GASES.

Application filed September 25, 1920. Serial No. 412,889.

(GRANTED UNDER THE PROVISIONS OF THE ACT OF MARCH 3, 1921, 41 STAT. L., 1313.)

*To all whom it may concern:*

Be it known that I, GEORG SCHEIB, a citizen of the Republic of Germany, residing at Berlin, in the Republic of Germany, have invented certain new and useful Improvements in Methods and Apparatus for Regulating the Mixture of Gases (for which I have obtained the following patent: Germany, 321,122, May 21, 1920), of which the following is a specification.

My invention relates to the production of gas mixtures of any desired kind and especially to the regulation of the mixture relationship of the individual gases, whether the mixtures be made from gases ready to hand or those which are manufactured and which are at the same time made by a chemical process. The mixture relationship is always influenced by the movement of valves, cocks or the like regulating devices which control the in-flow to the mixing chamber. The invention consists in the process and apparatus for moving these regulating devices.

A process is already known for the adjustment of apparatus for regulating the mixture of gases by withdrawing an auxiliary stream of gas from the mixing space and causing the regulating apparatus to be adjusted automatically by the difference of pressure which the auxiliary stream of gas suffers in consequence of the absorption of one portion of the mixture. A process is also known in which the auxiliary stream of gas is divided into two parts and the regulating apparatus is adjusted by the difference in the speed of revolution of two gas meters of which the one measures the unaltered portion of the auxiliary stream of gas, and the other the portion altered by the absorption of one portion of the mixture. My new process relating to the regulation of the mixture of gases consists in this, that an auxiliary stream of gas is taken from a mixing chamber, divided into two parts, the one part changed by absorption of one or more of the mixed gases and the in-flow of gases to the mixing chamber is regulated by the difference in pressure between the changed and the unchanged portions of the auxiliary gas stream. That is, according as a greater or lesser amount of the absorbed gases is contained in the mixing chamber and therefore in the auxiliary gas stream the difference in pressure between the changed and the unchanged part of the auxiliary gas stream will become greater or smaller. The difference in pressure thus depends upon the content of certain gases in the mixture. Its height referring to the difference in pressure is a sign of whether the desired proportion of one or more of the absorbed gases is present or there is a greater or less amount than desired. And so if those gases are caused to be absorbed, the proportion of which in the mixture is of concern for the correct mixture, there is attained according to my process a permanent or continuous regulation of the proportion of absorbed gases in the mixture to be exactly followed at all times. As absorption fluid there is used a fluid suited to each gas and known in chemical technics. The auxiliary gas stream may be placed under a higher pressure so that absorption is facilitated and hastened.

My new device includes a cylinder with gas inlet and outlet, a piston, which is movable in the cylinder, one side of which piston is under the influence of the gases in the cylinder, means connected with said piston for adjusting the regulating device, an absorption chamber with gas inlet and outlet, likewise in connection with the said cylinder upon the side of the piston opposite to that which is influenced by the gas in the cylinder, and means to conduct gas into the inlets of the said cylinder and of the absorption chamber. Still other details to be described later belong to the invention.

My invention has this advantage that the portions of the auxiliary gas current taken simultaneously from the mixing chamber always react upon each other and therefore the movement of the regulating devices always results in exact correspondence with the gas mixture which at that or any given moment prevails in the mixing chamber, since the portions of the auxiliary gas stream at that moment reacting upon each other were taken from the mixing chamber. The regulation follows very rapidly, since only a small period of time elapses between the moment in which a certain amount of gas mixture leaves the mixing chamber and the moment in which it arrives in the regulating device. Besides this the device is very simple and reliable and exhibits other advantages which will be seen from the description.

The process is carried out in following manner: Gas is withdrawn from the mixing space in an uninterrupted stream by means of a pump or the like and for the purpose of active absorption is conducted under greater or less pressure to an absorption vessel which contains an absorption liquid corresponding to the gas to be absorbed or to the gaseous chemical combination to be absorbed. Shortly before its entry into the absorption vessel the auxiliary stream of gas withdrawn from the mixing space passes a liquid baffle which at the same time serves for cleansing the gas and in which a division of this stream of gas is effected. One half of the auxiliary stream of gas is for the purpose of absorption conducted through the interior of the absorption vessel. The interior of the absorption vessel is separated from the upper portion of the same by a piston or the like. As long as no absorption takes place in the interior of the absorption vessel, equal pressure prevails on both sides of the piston and the piston is held in a definite position by the power of springs or the like. If absorption takes place in the interior of the absorption vessel, this first causes a reduction of pressure within the absorption vessel and consequently under the piston while above the piston the original pressure remains unaltered. The difference of pressure thus produced causes a downward motion of the piston, and by means of this downward motion the piston closes an electric circuit which effects the adjustment of the actual regulating apparatus, of, for example, the nozzles, valves, slide valves or the like for the main gas inlet of the apparatus for making a gas mixture. The piston may at the same time in its movement set in action a recording indicator and an alarm device.

In the drawings in which similar reference numerals indicate the same parts in the several figures:

Figure 1 shows an arrangement of apparatus for suitably carrying out the process with a section of the absorption vessel taken on line A—B of Figure 2.

Figure 2 shows a plan view of the absorption vessel used in carrying out the process.

Figure 3 is a horizontal section on the line C—D of Figure 1.

Figures 4, 5, 6 and 7 are elevation and plan views of liquid baffles.

$a$ and $b$ form the lower portion, $c$ and $d$ the upper portion of the absorption vessel A, $e$ is the absorption liquid, $f$ and $g$ are respectively the gas inlet and outlet for the actual absorption space, $h$ is a spiral tube which is attached to the gas inlet $f$ and has a row of holes which allow the gas to pass out into the absorption liquid $e$. Above the spiral tube $h$ is situated the screen $i$ which carries a row of glass tubes $k$ whereby the absorption is accelerated. $l$ is the piston. This is held in position by a spring $m$; the tension of the spring $m$ in its position of rest is adjusted by the help of the spring adjuster $n$ fixed on the piston rod $p$ and of the set screw $o$. The spring has its abutment in the upper portion $c$ of the absorption vessel A. The piston rod $p$ is taken through the set screw $o$ in a gas tight manner and carries a nut $q$ adjustable as to its height which holds in position a plate $r$ easily movable along the rod $p$; $s$ and $t$ are electrodes on which the plate $r$, insulated from the rod $p$ and nut $q$, rests when the piston $l$ descends, $u$ and $v$ are respectively gas inlet and outlet for the upper portion of the absorption vessel.

Figures 4 and 5 shew in elevation and plan, the construction of the liquid baffle B introduced into the gas inlet channel in front of the absorption vessel. The same consists of the housing 1, the liquid 2, a partition wall 3, an admission pipe 4, with the branches 5 and 6 and of two outlet connections 7 and 8 which are to be connected with $f$ and $u$.

Figures 6 and 7 illustrate in detail the liquid baffles B′, B′ which are fitted in the gas outlet channels of the absorption vessel. 9 is the housing, 10 the liquid, 11 the gas inlet, 12 the gas outlet; 11 is to be connected with $g$ and $v$.

As indicated in Figure 1, 20 is the mixing chamber or space which has its upper section connected preferably with the upper sections of the liquid baffles, B′, B′, shown in Figures 6 and 7, by means of gas outlet pipes 12, 12.

21 and 22 are the gas admission pipes leading in the lower portion of the mixing chamber or space 20, and the pipe 23 is the outlet pipe leading from the mixing chamber or space 20 for carrying the mixed gas to the point of consumption. A pipe 24 leads from the mixing chamber or space 20 to a pump or compressor 25, said pump 25 subjecting the gas to a higher pressure and by means of pipe 4 and branch pipes 5 and 6 conveys the compressed gas into the liquid baffle B shown in Figures 4 and 5. One of said admission pipes 22 is provided with a regulator or damper 26 controlled by an electric motor 27 operated by a battery 28 within the electric circuit of conductors 29 and 30, whose ends are connected to the electrodes $s$ and $t$, respectively, as shown in Figure 1.

The method of operation of the apparatus is as follows: The auxiliary stream of gas withdrawn from the mixing space or chamber 20 is conducted by means of the pump 25 or the like to the liquid baffle illustrated in Figures 4 and 5 through the inlet pipe 4 and is divided by the branches 5 and 6, the one portion passes through the tubes 7, $f$ and $h$ into the lower portion of the absorption vessel and consequently under the piston $l$, the other portion through the tubes 8 and $u$ into the upper portion of the absorption vessel A and consequently above the piston $l$. As long as there is no difference of pressure between the lower portion $a$ and $b$ and the upper portion $c$ and $d$ of the absorption vessel, the piston $l$ is kept in its position by means of the spring $m$. The gas passes out of the absorption vessel through the pipe connections $g$ and $v$ and thence goes on to the liquid baffle B', B' illustrated in Figures 6 and 7 one of which is to be connected to each of the pipes $g$ and $v$ by means of its connection 11. The gas leaves the two latter liquid baffles by the connections 12 and can thence be again conducted into the mixing space or chamber 20. If absorption takes place in the lower portion $a$ and $b$ of the absorption vessel A, a reduction of pressure ensues in the interior of the absorption vessel since a sudden or too rapid equalization of pressure between the absorption vessel and the piping arranged in front of and behind the liquid baffles cannot take place owing to these baffles. The reduction of pressure in the actual absorption space, as soon as the pressure above the piston outweighs the resistance of the spring $m$, causes a descent of the piston $l$, which becomes the greater the greater is the difference of pressure prevailing above and below the piston. In consequence of the downward motion of the piston the plate $r$ rests on the two electrodes $s$ and $t$ and thus effects the closing of the external circuit, while the piston $t$ can continue its downward motion unhindered. Closing the circuit effects the adjustment of the regulating apparatus or damper 26 for the main stream of gas and thereby an alteration in the gas or air admission for the mixing or combustion process. The closing of the circuit is maintained until the pressure of the spring $m$ again becomes greater than the difference of pressure above and below the piston; thereupon the piston again returns into its original position and at the same time lifts the plate $r$ off the electrodes $s$ and $t$, whereby the circuit is again interrupted so that no further adjustment of the regulating apparatus 26 takes place.

Furthermore, if for example the carbonic acid content of the gases of combustion is to be used for the regulation of a combustion process, a furnace which is being used for making a mixture of combustion gases, the herein described apparatus may be used to close the circuit at a permitted maximum content of carbonic acid, thus effecting a diminution in the air supply or the like, and a similar apparatus may be provided for on the same furnace in which the absorption of carbon-monoxide operates at a permitted maximum content towards an increase in the air supply or the like. A solution of caustic potash may be employed as absorbing liquid for carbonic acid and an ammoniacal solution of cuprous chloride for carbon monoxide.

In the recovery of nitrogen from the atmospheric air by means of copper and copper oxide the process may be employed for regulating the flow of air and the flow of the reducing gases and also for regulating any gaseous fuels or heating gases which may be admitted.

I claim:—

1. A method in regulating a mixture of gases which comprises withdrawing from a mixing space an auxiliary stream of gas, dividing said auxiliary stream of gas into two parts, altering one part of said auxiliary stream of gas by the absorption of one or more of the mixed gases, and controlling the flow of gases to the mixing chamber by the difference of pressure of the altered and unaltered part of said auxiliary stream of gas.

2. A method in regulating a mixture of gases which comprises withdrawing from a mixing space an auxiliary stream of gas, subjecting said auxiliary stream of gas to a higher pressure suitable for absorption, dividing said auxiliary stream of gas into two parts, altering one part of said auxiliary stream of gas by the absorption of one or more of the mixed gases and controlling the flow of gases to the mixing chamber by the difference of pressure of the altered and unaltered part of said auxiliary stream of gas.

3. An apparatus controlling a regulator for the mixture of gases which comprises a cylinder having a gas inlet and outlet, a piston movable in said cylinder and acted on one side by the gas within the cylinder, means connected to said piston for controlling the adjustment of the regulator, an absorbing chamber having a gas inlet and outlet and in communication with said cylinder on the side of said piston opposite to that acted upon by the gas within the cylinder, and means for conveying gas into the inlets of said cylinder and absorbing chamber.

4. An apparatus controlling a regulator for the mixture of gases which comprises a cylinder having a gas inlet and outlet, a piston movable in said cylinder and acted on one side by the gas within the cylinder, means connected to said piston for controlling the adjustment of the regulator, an absorbing chamber having a gas inlet and outlet and in communication with said cylinder on the side of said piston opposite to that acted upon by the gas within the cylinder, and means for conveying gas under pressure into the inlets of said cylinder and absorbing chamber.

5. An apparatus controlling a regulator for the mixture of gases which comprises a cylinder having a gas inlet and outlet, a piston movable in said cylinder and acted on one side by the gas within the cylinder, means connected to said piston for controlling the adjustment of the regulator, an absorbing chamber having a gas inlet and outlet and in communication with said cylinder on the side of said piston opposite to that acted upon by the gas within the cylinder, means for conveying gas into the inlets of said cylinder and absorbing chamber, and liquid baffles interposed in the inlets and outlets of said cylinder.

6. An apparatus controlling a regulator for the mixture of gases which comprises a cylinder having a gas inlet and outlet, a piston movable in said cylinder and acted on one side by the gas within the cylinder, means connected to said piston for controlling the adjustment of the regulator, an absorbing chamber having a gas inlet and outlet and in communication with said cylinder on the side of said piston opposite to that acted upon by the gas within the cylinder, means for conveying gas into the inlets of said cylinder and absorbing chamber, and liquid baffles interposed in the inlets and outlets of said absorbing chamber.

In testimony whereof I have hereunto signed my name.

GEORG SCHEIB.